Aug. 30, 1960 E. M. GOODELL 2,951,248
TERRAIN OBSTACLE DETECTOR
Filed Feb. 12, 1958

EVERETT M. GOODELL
INVENTOR.
BY Allen E. Botney, Agent
Morris Spector
ATTORNEY

United States Patent Office 2,951,248
Patented Aug. 30, 1960

2,951,248

TERRAIN OBSTACLE DETECTOR

Everett M. Goodell, Palos Verdes Estates, Calif., assignor to The Ramo-Wooldridge Corporation, Hawthorne, Calif., a corporation of Delaware Filed Feb. 12, 1958, Ser. No. 714,733

11 Claims. (Cl. 343—113)

The present invention relates in general to devices for detecting terrain obstacles and more particularly to a detector device of the type mentioned that may be accurately and reliably used in aircraft to indicate the presence of a dangerous terrain obstacle ahead of the aircraft and the direction in which the aircraft should be turned to avoid the danger.

The present invention is an outgrowth of the invention disclosed in copending U.S. patent application Serial No. 587,768, for "A Collision Indication System," by Emory Lakatos et al., filed May 28, 1956, and assigned to The Ramo-Wooldridge Corporation of Los Angeles, California. Accordingly, the features of the present invention will be described in connection with radar and collision warning for aircraft. However, the present invention may be used with good advantage in other areas as well such as, for example, in warning ships at sea of the presence of other ships or icebergs.

In any proposed aircraft collision warning system, it is most desirable that the system include a feature that will warn against any large terrain obstacle that may loom ahead, such as a mountain, in sufficient time to permit the operator of the aircraft to swerve it away from the obstacle and out of danger. Radar systems are customarily used for collision warning purposes and although the radar signal returned from an object as large as a mountain has a large amplitude and can, therefore, normally be detected by means of a range gate and amplitude detector combination, no simple, accurate and reliable means has yet been made available for indicating as well the direction from which the radar signals are returning or, stated differently, the direction in which the aircraft is to be turned to avoid the obstacle.

In previous collision indication systems, for example, two antennas have been used for receiving the radar signals reflected from the target in a space diversity technique, a comparison being made of the amplitudes of the signals returned from the obstacle to the two antennas from which comparison a directional command signal is derived. However, such amplitude comparison schemes are subject to serious problems in maintaining identical gains in the two associated detecting channels and in maintaining identical pedestals in the two range gates, thereby very greatly reducing the reliability of such earlier devices.

It is, therefore, an object of the present invention to provide a detector circuit for automatically, accurately and reliably indicating to the pilot of an aircraft both the imminent danger to the aircraft of a large terrain obstacle ahead and the direction in which the aircraft should be turned to avoid a collision with the obstacle.

It is another object of the present invention to provide an obstacle detector circuit that will accurately and reliably supply directional information about a target appearing in front of an aircraft by noting the phase difference between the signals returned by the target to two different points on the aircraft.

The limitations mentioned above concerning the prior art types of obstacle detector devices can be overcome by comparing the relative phases rather than the amplitudes of received signals. According to the basic concept of the present invention, when the wavefront of a signal is intercepted by two antennas that are suitably spaced from each other, the signal induced in one antenna will be out of phase with the signal induced in the other antenna due to the additional distance that the wavefront has had to travel to reach one of the antennas. If one of the induced signals is used as a reference, then the other of the induced signals will either lead or lag the reference signal depending on whether the obstacle is to the left or right of the reference antenna. Thus, the phase difference between the two induced signals may be used to obtain the direction of an obstacle relative to the mother aircraft.

More particularly, according to a preferred embodiment of the subject invention, the signal wavefront reflected from a terrain obstacle appearing within a predetermined frontal angle is received at a pair of appropriately spaced antennas, each antenna being properly shielded from the other so as to view a separate quadrant of space. If the obstacle is also within predetermined range limits, the signals induced in the two antennas are separately channeled to an "and" gate which thereupon activates an output indicator device for informing the pilot of the aircraft that he is in imminent danger from some terrain obstacle ahead. Obviously, since an "and" gate is used, the pilot will be so informed only when signals are received at both antennas and since they are suitably shielded from each other as mentioned above, signals will be contemporaneously received by the antennas only when the obstacle appears in the aforementioned predetermined angle or danger zone. The two signals are also applied to a phase detector circuit arrangement, the output signal of which is also used in the output indicator device for specifically informing the pilot whether the obstacle is to the left or right of the aircraft or dead ahead.

Since the present invention at no time compares the amplitude of the signals induced in the two antennas for obtaining information, the gains of the various circuits used in the embodiment of the invention are not critical, as is the case in the prior art devices of this type. Furthermore, since a frequency and phase correlation exists between the signals induced in the antennas, an embodiment of the present invention is not as susceptible to interference signals as the earlier devices.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1:
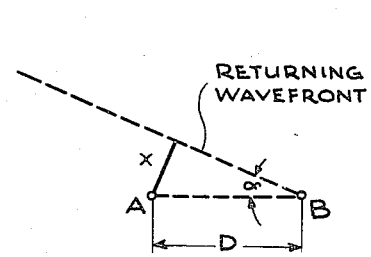
Figure 1 is a planar representation of a signal wavefront arriving at a pair of spaced antennas.
Figure 2:
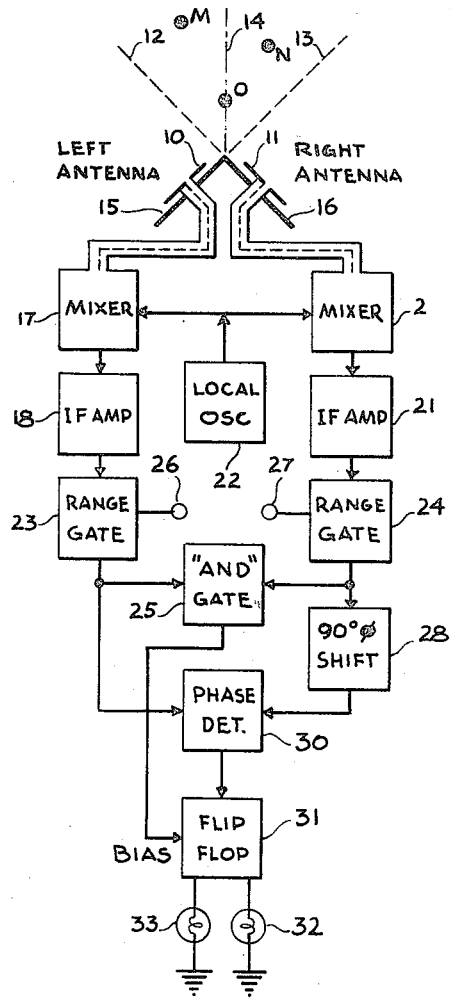
Figure 2 is a block diagram of a preferred embodiment of a terrain obstacle detector according to the present invention.

Referring now to the drawings, there is shown in Fig. 1 a simple diagram which may be used to explain the principle underlying the operation of the present invention of which an embodiment is shown in block form in Fig. 2. Referring to Fig. 1, points A and B represent two antennas separated from each other by a distance D. The wavefront of a signal reflected from a distant target is shown at the moment it intercepts one of the two antennas, namely, antenna B. As shown, the angle between the wavefront and the line joining antennas A and B is $\alpha$. The perpendicular distance from antenna A to the wavefront is designated $x$. If $\Delta\phi$ represents the phase difference between the signals respectively induced in antennas A and B, then $$\Delta\phi = \omega \Delta t$$

where $\Delta t$ corresponds to the difference in time of arrival of the wavefront at the two antennas. But $$\Delta t = \frac{x}{\lambda f}$$

where
  $\lambda$ = wavelength, and
  $f$ = frequency of the wavefront signal

However,
$$\omega = 2\pi f$$
and
$$x = D \sin \alpha$$

Accordingly, by appropriate substitution $$\Delta\phi = 2\pi \frac{D}{\lambda} \sin \alpha = \frac{2\pi}{\lambda} x$$

It is thus seen that the phase angle between the signals induced in antennas A and B is a function of the angle $\alpha$ formed by the wavefront with the line connecting the two antennas or, stated differently, is a function of the distance $x$, which is the additional distance the wavefront has to travel to reach the second antenna after having been intercepted by the first. It will be obvious to those skilled in the art that for a maximum $\Delta\phi$ of 180° corresponding to $\alpha=90°$, the maximum allowable value for $D/\lambda$ is ½. As long as $D/\lambda$ is kept less than ½, no ambiguity in directional sense will exist.

Referring now to Fig. 2, the embodiment of the present invention shown therein includes a pair of antennas 10 and 11 that are preferably oriented with respect to each other so as to form a 90° angle therebetween, as indicated by dashed lines 12 and 13. Dashed line 14 is a center line and divides the angle formed by the antennas into two smaller equal angles, each smaller angle therefore being substantially 45°. Immediately behind antennas 10 and 11 and insulated therefrom are a pair of reflectors 15 and 16, respectively, the reflectors being oriented in the same manner as the antennas, as shown in the diagram. Thus, because of the presence of the reflecting shields, only signals reflected from a target positioned within the 90° frontal angle formed by lines 12 and 13 will be received by both antennas 10 and 11. Stated in a different way, signals reflected from a target lying in the angle between antenna 11 and line 13 will be reflected by shield 16 and, therefore, for all practical purposes, the signal wavefront will never reach antenna 10. Likewise for targets in the area bounded by antenna 10 and line 12, wavefronts of signals reflected from these targets never reach antenna 11.

Antennas 10 and 11 are coupled to two distinct, preferably identical, radio receiver channels, one for each antenna. The channel associated with antenna 10 comprises a mixer circuit 17 connected between the antenna and an intermediate-frequency amplifier 18. Similarly, the channel associated with antenna 11 comprises a mixer circuit 29 connected between the antenna and an intermediate-frequency amplifier 21. A single local oscillator circuit 22 is also connected between mixers 17 and 20 and, therefore, applies the same signal to both. A pair of range-gate circuits 23 and 24 are connected to amplifiers 18 and 21, respectively, the output ends of the two range gates being respectively connected to the two input terminals of a coincidence or "and" gate circuit 25. Any one of a number of such circuits well known in the art may be adapted for use as an "and" gate herein such as that shown on page 407 of the book entitled "Active Networks" by V. C. Rideout, published in 1954 by Prentice-Hall Inc., New York.

Considering range-gate circuits 23 and 24 in greater detail, a range-gate circuit of the kind used herein may be defined as one that will only pass signals returned from a target located between predetermined upper and lower range or distance limits from the aircraft. For this purpose, each range-gate circuit comprises an ordinary gating circuit many of which are well known in the art. The gating circuits are normally in an inoperative condition and hence will not normally pass signals applied to them. However, in response to a voltage pulse periodically applied to input terminals 26 and 27 of range gates 23 and 24, respectively, by a common pulse source (not shown), both gating circuits are rendered operable to pass signals which may be applied to them for the duration of the pulse. In the present instance, the interval of time between the leading edges of successive pulses applied to terminals 26 and 27 preferably corresponds to a lower target range limit of 10,000 feet and the interval of time between the leading edge of a pulse and the lagging edge of the succeeding pulse preferably corresponds to an upper target range limit of 12,500 feet. Thus, signals will be applied to the two inputs of "and" gate 25 only from obstacles at a distance of from 10,000 to 12,500 feet from the aircraft.

Considering the over-all circuit of Fig. 2 once again, range gate circuits 23 and 24 are also connected to a 90° phase shifter circuit 28 and a phase detector circuit 30, range gate 24 being connected to the phase shifter circuit and range gate circuit 23 being connected to a first input terminal of the phase detector. A second input terminal of the phase detector 30 is connected to the output end of phase shifter 28. A plurality of phase detector circuits which may be adapted for use in the circuit of the present invention are shown and described on pages 511 to 524 of volume 19 of the M.I.T. Radiation Laboratory Series entitled "Waveforms," published in 1949 by the McGraw-Hill Book Co., Inc., New York.

Figure 3:
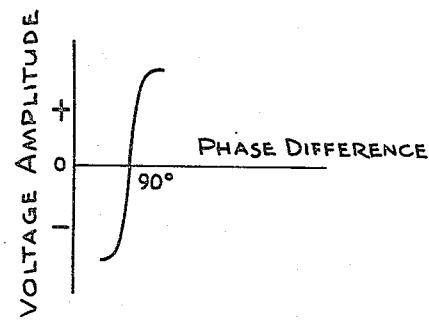
Figure 3 is a graph illustrating the output voltage-phase difference characteristic of a phase detector circuit used in the embodiment of Fig. 2.

With respect to phase shifter circuit 28, it should be noted here that the embodiment of Fig. 1 is operable without such a phase shifter circuit. In other words, successful operation may be obtained by connecting range-gate circuit 24 directly to detector 30 rather than through phase shifter 28. However, the phase shifter is included to increase the accuracy of the results as may be seen by reference to the graph shown in Fig. 3. More specifically, the graph represents the operating characteristic of phase detector 30 and is a plot of the voltage amplitude of the signal derived at the output of the detector against the phase difference between the signals applied to the inputs thereof. As shown, the graph is most linear in the region where the phase difference is substantially 90° with the result that small changes in phase difference between the two signals applied to the detector will product the greatest amplitude effects at the detector output. It will thus be recognized that, as mentioned above, the phase shifter circuit will help produce more accurate results in the operation of the circuit arrangement of Fig. 2.

Phase detector circuit 30 is connected at its output end to one of two inputs to a conventional bistable multivibrator or flip-flop circuit 31, the other of the flip-flop inputs being connected to the output end of "and" gate 25. It should be assumed that in accordance with usual practice, the phase detector will include a filter so that pulsed signals produced by the detector will be smoothed out and a steady signal available to operate the flip-flop. Indicating elements, such as lamps 32 and 33, are connected between flip-flop 31 and ground.

Considering now the operation, it will be assumed that a terrain obstacle, such as a mountain, is encountered in the region of space between lines 12 and 14 in Fig. 2. For purposes of explanation, such obstacle will be represented by a point designated M. Since the obstacle is located in the general region of space bounded by lines 12 and 13, the wavefront of the radar signal reflected from the obstacle will be received at both antennas 10 and 11, the wavefront arriving at antenna 10 a very short time before it arrives at antenna 11. As a result, a signal will be induced in antenna 10 before a similar signal is induced in antenna 11. However, the time interval between these two signals will also be very small so that they will overlap in time for substantially their entire duration.

The pulse signals generated in antennas 10 and 11 are respectively applied to mixers 17 and 20 which heterodyne these signals against the signal generated by local oscillator 22 to produce output signals at an intermediate frequency which is either the sum or difference of the signals applied to the mixers by the antennas and local oscillator, the frequency of these output signals preferably being the latter and the envelope of which provides the control information. The signals produced by mixers 17 and 20 are respectively applied to intermediate-frequency amplifiers 18 and 21, any difference in phase between the two original signal envelopes being maintained at the amplifiers due to the use of a common local oscillator for the mixers. The intermediate-frequency amplifiers amplify the pulse signals and thereafter apply them to range-gate circuits 23 and 24 which, in response to range-gate pulses applied to terminals 26 and 27, pass the signals to "and" gate 25 if the signals are received during the range gate pulse periods. The "and" gate signal produced in response thereto appropriately biases flip-flop 31 to activate it, that is, to render it operable, thereby momentarily turning on one of the warning lamps 32 or 33. Simultaneously with the triggering of flip-flop circuit 31, a signal is applied to the flip-flop by phase detector 30 which signal will either cause the lamp already turned on to remain on or will cause this lamp to be turned off and the other on to provide the desired directional indication. This last operation just described occurs almost instantaneously, certainly too fast for the eye to follow, so that no confusion is caused at any time. For all practical purposes, it may be said that only one lamp is turned on.

More specifically, the signals passed by range-gate circuits 23 and 24 are applied to phase detector circuit 30, the signal from range gate 23 being applied to the first input terminal of the detector circuit and the signal from range gate 24, after being shifted in phase by 90° and amplified by phase shifter circuit 28, being applied to the second input terminal of the detector circuit. In the phase detector circuit, the signal out of the phase shifter is used as the reference signal and, since this signal has been amplified it will produce the same results that a pulse train would produce when applied to the phase detector and used therein as a reference.

Figure 4:
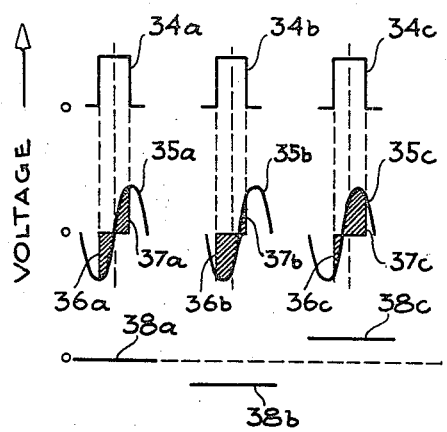
Figure 4 is a flow chart of the signals applied to and produced by the phase detector circuit used in the embodiment of Fig. 2.

To obtain a better understanding of what occurs in phase detector circuit 30 and the manner in which lamps 32 and 33 are affected, reference is made to Fig. 4 wherein pulse waveforms 34a, 34b and 34c represent successive outputs from phase shifter circuit 28 in Fig. 2, that is, the reference signal, and sine waveforms 35a, 35b and 35c represent successive outputs from range-gate circuit 23.

It can be seen from the figure that waveform 34a is centered with respect to waveform 35a and hence shaded areas 36a and 37a bounded by waveform 35a are equal. This condition corresponds to a zero voltage output from the phase detector as indicated by line 38a. On the other hand, when the pulse waveform is displaced from the center of the sine waveform, as is waveform 34b with respect to waveform 35b and waveform 34c with respect to waveform 35c, the associated shaded areas 35b, 37b and 36c, 37c, respectively, are not equal as before. These conditions correspond to either a negative or positive voltage output from phase detector 30 as indicated by lines 38b and 38c, respectively, negative line 38b corresponding to the phase relation between waveforms 34b and 35b and positive lines 38c corresponding to the phase relation between waveforms 34c and 35c.

Thus, a positive voltage developed by phase detector circuit 30 and applied to flip-flop circuit 31 may be used to indicate that the signal induced in antenna 10 lags the signal induced in antenna 11, which would correspond to a situation where the obstacle is located between lines 12 and 14, as shown by obstacle M. When this happens, lamp 33 is used to advise a right turn. Similarly, a negative voltage may be used to indicate that a leading phase angle is involved and, therefore, that the obstacle to be avoided is in the region between lines 13 and 14, as illustrated by point "N." In such an event, lamp 32 is used to advise a left turn.

In the case where the voltage developed at the output of phase detector circuit 30 is zero, such a result would correspond to the situation where the obstacle is "dead" ahead, that is to say, somewhere on line 14. In such an event, it makes no difference which way the aircraft is turned so that either of lamps 32 and 33 may be used to suggest the direction in which the aircraft should be turned. Since one of the two lamps is turned on when flip-flop circuit 31 is activated by "and" gate 25, as mentioned above, this lamp will remain on, thereby providing the aircraft with directional information even when the terrain obstacle is substantially equidistant from antennas 10 and 11.

Of course, where in this last set of circumstances the aircraft is turned in the direction indicated by the lighted lamp, a positive or negative output voltage will then be developed by the phase detector circuit depending upon the particular direction in which the aircraft has been turned. However, the lamp already lighted will continue on to indicate proper direction. For example, assume the presence of an obstacle along line 13 as indicated by point "O" in Fig. 2. One of the lamps, either lamp 32 or lamp 33, will therefore be turned on when flip-flop 31 is activated. For sake of example, lamp 32 will be considered as having been turned on. Accordingly, when the aircraft is turned toward the left, obstacle "O" will move into the region between lines 13 and 14 so that lamp 32 will remain on for the reasons previously explained. Similarly, where lamp 33 was originally turned on and the aircraft was turned toward the right, lamp 33 will continue to remain on thereafter for in this case obstacle "O" would move into the region between lines 12 and 14 instead.

When an obstacle is located outside the region bounded by lines 12 and 13, the returning signals are received in only one antenna due to the shielding effect of reflectors 15 and 16. Under this condition, only one channel will have a signal in it so that the "and" gate will not operate and no warning will be given. This is precisely what is desired, for any obstacle far to one side can and should be ignored.

It should be noted that the chances of faulty operation that might arise from noise may be further reduced by including a threshold circuit in each range gate, thereby taking advantage of the large signal return inherent from a mountain or other large obstacle.

Having thus described the invention, what is claimed is:

1. Receiver apparatus for detecting the presence of a terrain obstacle within a predetermined danger zone ahead of a craft and for indicating the direction in which the craft should be turned to avoid the obstacle, said apparatus comprising: first and second antenna means spaced from each other and positioned to cover different areas with the areas overlapping to contemporaneously receive signals reflected from only the terrain obstacle within the predetermined danger zone; phase detector means being responsive only to signals contemporaneously received by said first and second antenna means to produce an output voltage whose polarity corresponds to the phase angle between said signals, said output voltage being of one polarity when said phase angle is leading and of opposite polarity when said phase angle is lagging; and display means for indicating only in response to said output voltage the direction of the terrain obstacle relative to the craft, thereby indicating the direction in which the craft is to be turned to avoid the obstacle, the direction indicated depending upon the polarity of said output voltage.

2. Radar receiver apparatus for detecting the presence of a terrain obstacle within a predetermined danger zone ahead of an aircraft and for indicating the direction in which the aircraft should be turned to avoid the obstacle, said apparatus comprising: first and second antenna means spaced from each other and adapted to contemporaneously receive radar signals reflected from the terrain obstacle within the predetermined danger zone; coincidence means for producing a bias signal in response to the application thereto of signals contemporaneously received by said first and second antenna means; phase detector means responsive to said contemporaneously received signals to produce an output voltage whose polarity corresponds to the phase angle between said signals, said output voltage being of one polarity when said phase angle is leading and of opposite polarity when said phase angle is lagging; and display means triggered into operation by said bias signal to indicate in response to said output voltage the direction in which the aircraft is to be turned to avoid the obstacle, the direction indicated depending upon the polarity of said output voltage.

3. The apparatus defined in claim 2 wherein said first and second antenna means includes first and second antennas and first and second reflectors positioned behind said first and second antennas, respectively, and insulated therefrom, said antennas and reflectors being oriented in such a manner that said antennas contemporaneously receive signals reflected from a terrain obstacle only when said terrain obstacle is located in the predetermined danger zone.

4. Radar receiver apparatus for detecting the presence of a terrain obstacle within a predetermined danger zone ahead of an aircraft and for indicating the direction in which the aircraft should be turned to avoid the obstacle, said apparatus comprising: first and second antenna means spaced from each other and positioned to cover different areas with the areas overlapping to contemporaneously receive radar pulse signal envelopes reflected from only the terrain obstacle located within the predetermined danger zone; an oscillator circuit for generating a signal at a fixed frequency; first and second mixer circuits for heterodyning signals contemporaneously received by said first and second antenna means, respectively, against said oscillator signal to respectively produce first and second intermediate-frequency signal envelopes; phase detector means responsive only to contemporaneously received first and second intermediate-frequency signal envelopes to produce an output voltage whose polarity corresponds to the phase angle between said intermediate-frequency signals, said output voltage being of one polarity when said phase angle is leading and of opposite polarity when said phase angle is lagging; and display means for indicating only in response to said output voltage the direction of the terrain obstacle relative to the aircraft, thereby indicating the direction in which the aircraft is to be turned to avoid the obstacle, the direction indicated depending upon the polarity of said output voltage.

5. Radar receiver apparatus for detecting the presence of a terrain obstacle within a predetermined danger zone ahead of an aircraft and for indicating the direction in which the aircraft should be turned to avoid the obstacle, said apparatus comprising: first and second antenna means spaced from each other and adapted to contemporaneously receive radar signals having pulse envelopes reflected from the terrain obstacle located within the predetermined danger zone; an oscillator circuit for generating a signal at a fixed frequency; first and second mixer circuits for heterodyning signals contemporaneously received by said first and second antenna means, respectively, against said oscillator signal to respectively produce first and second intermediate-frequency signal envelopes; coincidence means responsive to said first and second intermediate-frequency signal envelopes to produce a bias signal; phase detector means responsive to said first and second intermediate-frequency signal envelopes to produce an output voltage whose polarity corresponds to the phase angle between said intermediate-frequency signal envelopes, said output voltage being of one polarity when said phase angle is leading and of opposite polarity when said phase angle is lagging; and display means triggered into operation by said bias signal to indicate in response to said output voltage the direction in which the aircraft is to be turned to avoid the obstacle, the direction indicated depending upon the polarity of said output voltage.

6. The apparatus defined in claim 5 wherein said first and second antenna means includes first and second antennas and first and second reflectors positioned behind said first and second antennas, respectively, and insulated therefrom, said antennas and reflectors being oriented in such a manner that said antennas contemporaneously receive signals reflected from a terrain obstacle only when said terrain obstacle is located in the predetermined danger zone.

7. Terrain obstacle detector apparatus for a radar receiver, said apparatus comprising: first and second antenna means spaced from each other and adapted to contemporaneously receive radar signals having an envelope reflected from a terrain obstacle only when such obstacle is located within a predetermined dihedral of space; an oscillator circuit for generating a signal at a fixed frequency; first and second mixer circuits for heterodyning signals received contemporaneously by said first and second antenna means, respectively, against said oscillator signal to respectively produce first and second intermediate-frequency signals having envelopes; first and second range-gate circuits for passing said first and second intermediate-frequency signal envelopes only when signals contemporaneously received by said first and second antenna means are reflected from an obstacle located between predetermined upper and lower limits of distance from the apparatus; coincidence means responsive to first and second intermediate-frequency signal envelopes passed by said first and second range-gate circuits, respectively, to produce a bias signal; phase detector means responsive to first and second intermediate-frequency signal envelopes passed by said first and second range-gate circuits, respectively, to produce an output voltage whose polarity corresponds to the phase angle between said intermediate-frequency signal envelopes, said output voltage being of one polarity when said phase angle is leading and of opposite polarity when said phase angle is lagging; and display means activated by said bias signal to indicate in response to said output voltage the direction of said obstacle relative to the apparatus, the direction indicated depending upon the polarity of said output voltage.

8. The apparatus defined in claim 7 wherein said first and second antena means includes first and second antennas and first and second reflectors positioned behind said first and second antennas, respectively, and insulated therefrom, said antennas and reflectors being oriented in such a manner that said antennas contemporaneously receive signals reflected from a terrain obstacle only when said obstacle is located in the predetermined dihedral zone of space.

9. Terrain obstacle detector apparatus for a radar receiver, said apparatus comprising: first and second antenna means spaced from each other and adapted to contemporaneously receive radar signals reflected from a terrain obstacle only when such obstacle is located within a predetermined dihedral zone of space; first and second range-gate circuits for passing signals contemporaneously received by said first and second antenna means, respectively, only when said obstacle is located between predetermined upper and lower limits of distance from the apparatus; coincidence means responsive to signals passed by said first and second range-gate circuits to produce a bias signal; phase detector means responsive to signals passed by said first and second range-gate circuits to produce an output voltage whose polarity corresponds to the phase angle between said passed signals, said output voltage being of one polarity when said phase angle is leading and of opposite polarity when said phase angle is lagging; display means for indicating in response to said output voltage the direction of said obstacle relative to the apparatus, the direction indicated depending upon the polarity of said output voltage.

10. Terrain obstacle detector apparatus for a radar receiver, said apparatus comprising: first and second antenna means spaced from each other and adapted to contemporaneously receive radar signals reflected from a terrain obstacle only when such obstacle is located within a predetermined dihedral zone of space; first and second range-gate circuits for passing signals contemporaneously received by said first and second antenna means, respectively, only when said obstacle is located between predetermined upper and lower limits of distance from the apparatus; coincidence means responsive to signals passed by said first and second range-gate circuits to produce a bias signal; phase shifter means for shifting the phase of signals passed by said second range-gate circuit by substantially 90°; phase detector means responsive to signals passed by said first range-gate circuit and signals shifted in phase by said phase shifter means to produce an output voltage whose polarity corresponds to the phase angle between signals contemporaneously received by said first and second antenna means, said output voltage being of one polarity when said phase angle is leading and of opposite polarity when said phase angle is lagging; display means for indicating in response to said output voltage the direction of said obstacle relative to the apparatus, the direction indicated depending upon the polarity of said output voltage.

11. The apparatus defined in claim 10 wherein said display means includes a flip-flop circuit and a pair of lamps, said flip-flop circuit normally being inoperable and rendered operable in response to said bias voltage to turn on one or the other of said lamps in response to said output voltage, the particular lamp turned on depending upon the polarity of said output voltage.

References Cited in the file of this patent
UNITED STATES PATENTS

| | | |
|---|---|---|
| 2,467,361 | Blewett | Apr. 12, 1949 |
| 2,509,207 | Busignies | May 30, 1950 |